United States Patent [19]

Hsu

[11] Patent Number: 5,007,405
[45] Date of Patent: Apr. 16, 1991

[54] SOLDERING TOOL
[76] Inventor: David Hsu, 801, No. 125, Sec. 3 Roosevelt Rd., Taipei, Taiwan
[21] Appl. No.: 513,617
[22] Filed: Apr. 24, 1990
[51] Int. Cl.$^5$ ............................................. B23K 3/02
[52] U.S. Cl. ..................................... 126/414; 126/413
[58] Field of Search ............... 126/413, 403, 406, 405, 126/414; 431/328, 354; 272/2; 228/51

[56] References Cited
U.S. PATENT DOCUMENTS

| 4,119,088 | 10/1978 | Sim | 126/413 |
|---|---|---|---|
| 4,631,024 | 12/1986 | Shibata et al. | 126/409 |
| 4,641,632 | 2/1987 | Nakajima | 126/413 |
| 4,805,593 | 2/1989 | Hsu | 126/414 |
| 4,858,593 | 8/1989 | Hsu | 126/413 |

Primary Examiner—James C. Yeung
Attorney, Agent, or Firm—Bucknam and Archer

[57] ABSTRACT

A soldering tool comprises a cylindrical gas tank 10 which stores fuel gas and also encloses the greatest part of a switching and pressure regulating device. This device is composed of a rear barrel assembly 20 which contains a gas intake rod 25, a needle valve 311, gas filters, sealing or stopping rings and a gas inlet hole 314 through the valve stem wall, sealing or stopping rings, and a front barrel assembly 40 which is connected to the rear barrel assembly with a connector 42 provided with a further filter and a nozzle 426. Air inlet hole 314 provided in the side wall of the front barrel lets air mix with the gas flow just passing through the nozzle. The mixed fuel stream passes through a cooling fin assembly 50 and reaches the tool head which may have a catalytic heated soldering tip or a hot knife, or a torch. Through successive filtering, stopping, expanding and mixing, the fuel-air mixture of clean and well controlled pressure provides a desired quality and quantity for use with water.

10 Claims, 10 Drawing Sheets

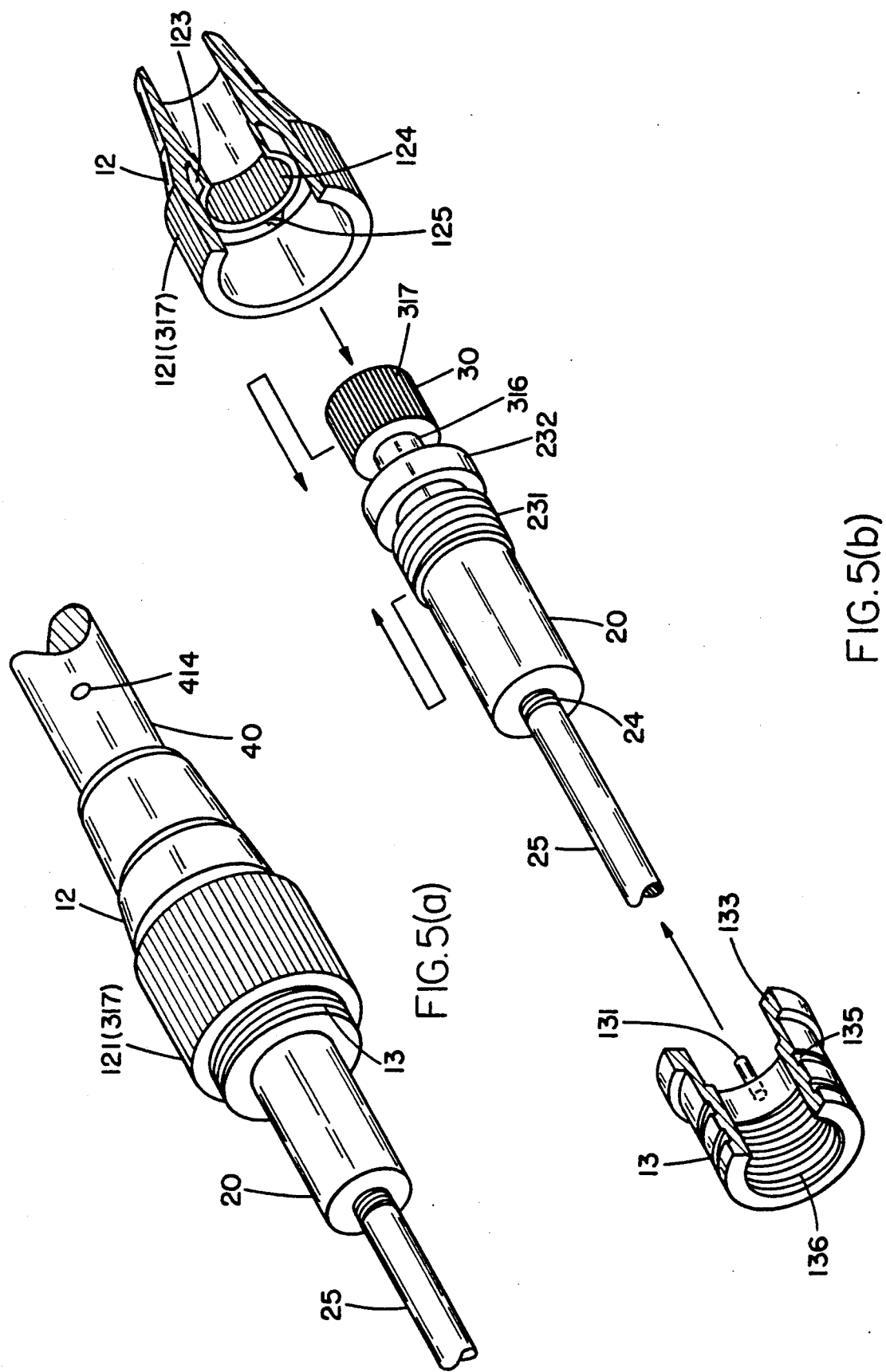

SOLDERING TOOL

FIELD OF THE INVENTION

The present invention relates to soldering tools and more particularly to a gas powered tool having an interchangeable tool head including a catalytic heated soldering tip or a hot knife, or a torch.

DESCRIPTION OF THE PRIOR ART

Soldering tools of this type are known, in which usually gas is introduced to undergo combustion and to bring the tip up to an operating temperature. However, the regulation of the gas stream usually is not smoothly conducted so that a considerable amount of gas fuel is wasted.

The most commonly seen drawback of this type of soldering tool, in addition to the above, consists of the incomplete mixing of gas and air since the structure of the mixing chamber is not well shaped, so that even at a later stage, the air-gas mixture is distributed through a manifold, and this does not help the combustion.

The soldering tool such as disclosed in U.S. Pat. No. 4,133,301 comprises a soldering tip connected to a gas catalytic combustion element wherein the catalytic element extends around the manifold and a plurality of radial holes extends through the manifold delivering fuel gas to the element.

In the same United States patent, a structure is described in which a handle portion extends from the manifold, the handle portion being formed by a housing which houses the means for mixing air with the fuel gas, means for isolating the fuel gas and means for regulating the fuel flow.

In European Patent publication No. 0,118,282, a soldering tool is disclosed in which the tip is carried solely by an internal support, and the support is carried on a fuel supply pipe which acts to connect the tip to a body, and the tool comprises a handle portion being formed by the housing which houses means for mixing air with fuel gas, means for isolating the fuel gas from the catalyst element and means for regulating the flow of the fuel gas.

It can clearly be seen that the flow regulation through the devices of the prior art is quite complicated and unsatisfactory and economy of the fuel consumption cannot be achieved. The applicant of the present invention has devoted time to the improvement of these soldering tools. U.S. Pat. No. 4,858,593 recently granted to the same applicant describes a portable soldering tool having a dual stage flow regulating means including a knob operated needle valve and a spring biased nozzle. The gas pressure discharged from the nozzle is just right for mixing with the air entering the housing to give an effective and economical mixture.

SUMMARY OF THE INVENTION

The main object of the present invention is to provide a more compact tool with most regulating parts contained in a rear barrel which is enclosed in a gas tank serving as tool holder and a front barrel as the air-gas mixer, the barrels being joined by a connector provided with a nozzle.

Another object of the present invention is to provide multi-filter means along the gas passage and proper baffling or stopping rings to ensure the best quality and steady quantity of gas supply with steady pressure.

Other objects and features of the present invention will be apparent through a detailed description accompanying the annexed drawings, of which:

FIG. 5 is a diagram showing the enlarged view of cap 12 and the adjacent elements therein;

Figure 7:
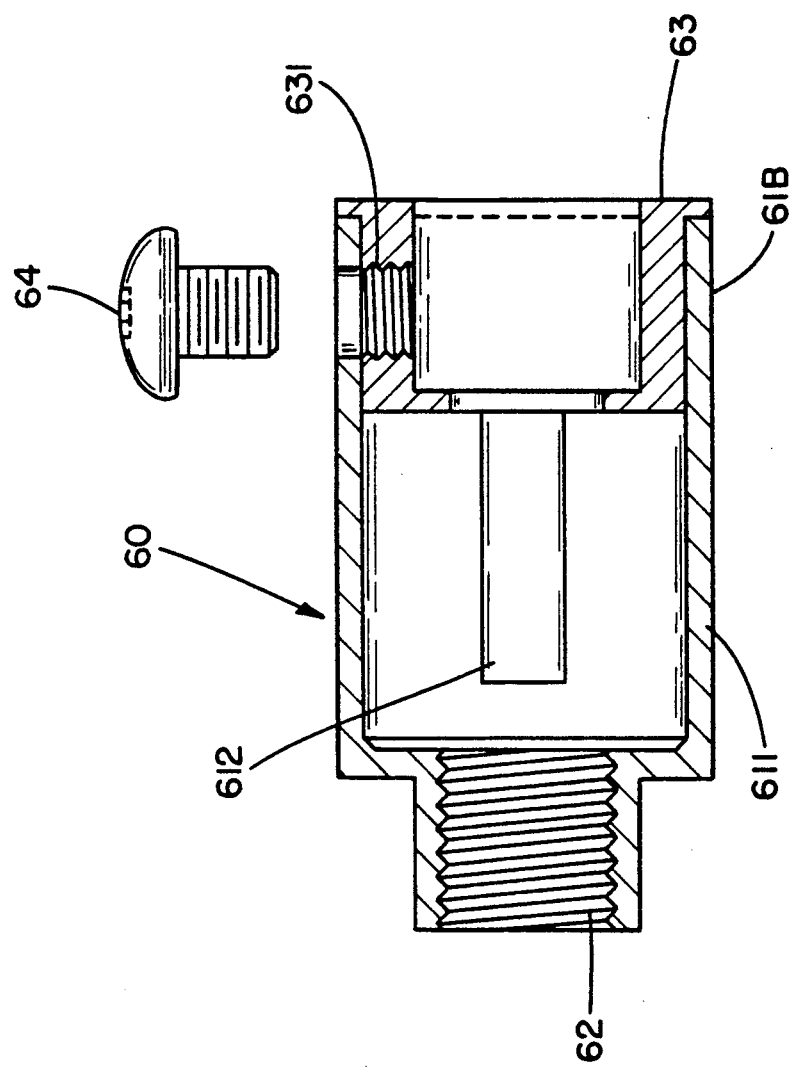
Figure 8:
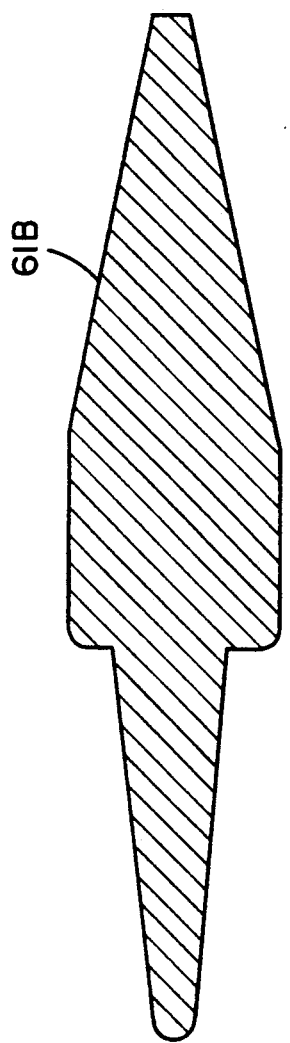
Figure 9:
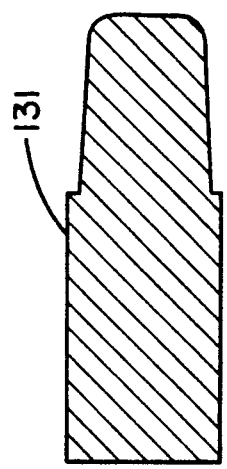
Figure 10B:
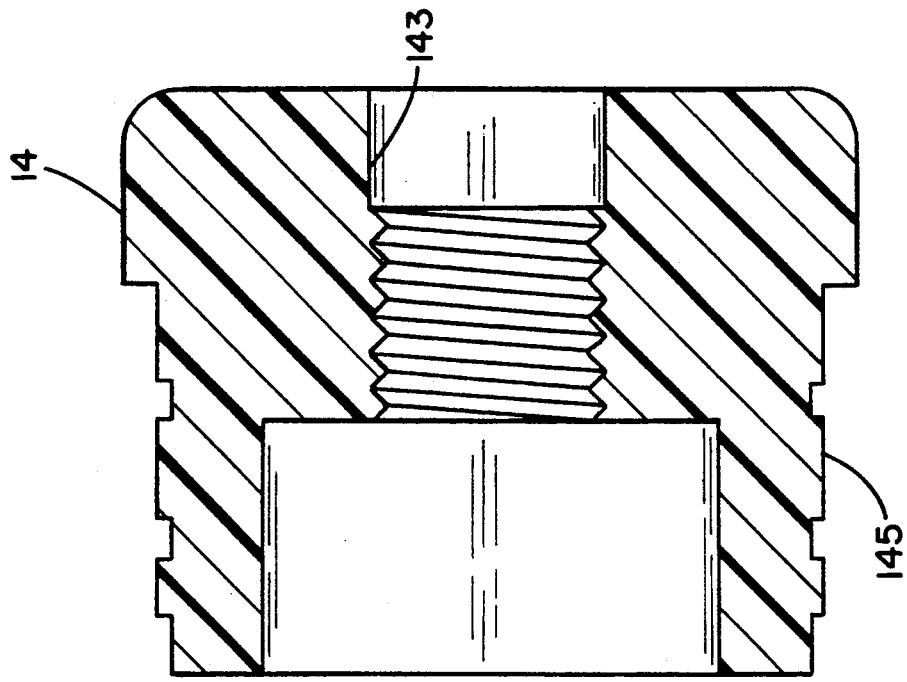
Figure 10A:
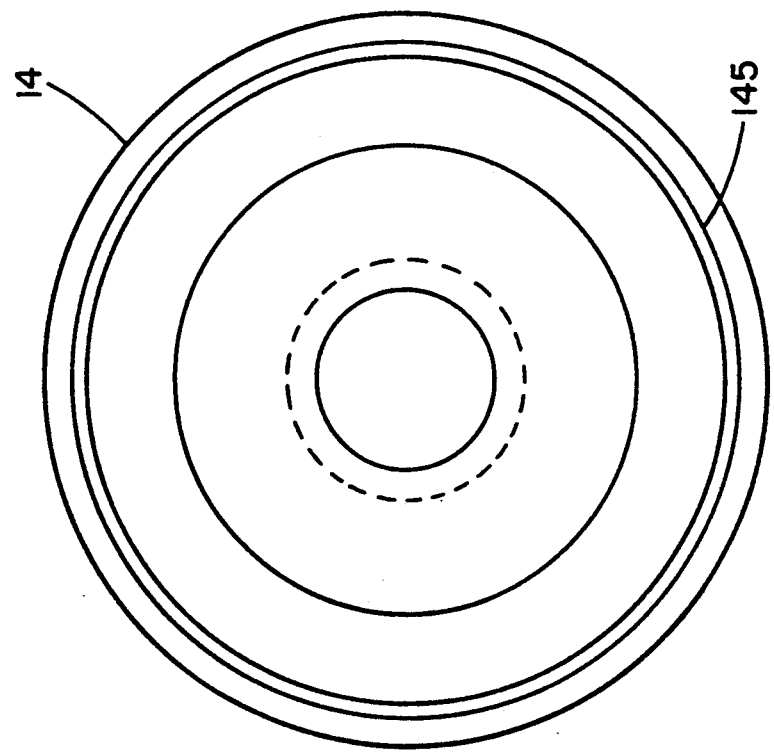

FIG. 7 is a diagram showing the enlarged view of tool head 60, wherein via female thread 631, a screw 64 locks with the soldering tip 61B inserted in seat 63; 611 is the wall of 60: 612 is a window; 62 is female thread to engage with cooling fin 50:

FIG. 8 is a diagram showing the enlarged view of soldering tip 61B to be inserted into 60;

FIG. 9 is a diagram showing the enlarged view of pin to be inserted in 232:

FIG. 10 is a diagram showing the enlarged view of feed valve seat 14, wherein 143 is the space to receive feed valve 15

Figure 11:
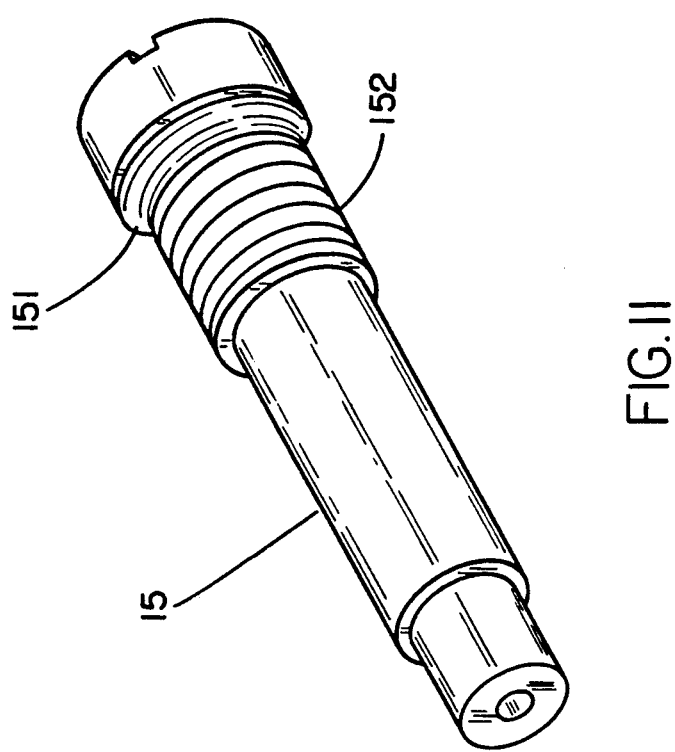

FIG. 11 is a diagram showing the enlarged view of the gas feed valve, wherein 151 is an 0 ring to keep gas tight, and is a male thread to engage with the female thread of FIG. 10.

A list of the parts is annexed hereinbelow for an easier reference throughout the description of the drawings.

PARTS LIST 10 gas tank
11 front opening
111 female thread (to 231)
12 cap
121 on/off switch (317)
123 space for pin's rotation
124 knurled groove to receive 317
125 pin stopper
13 collar
131 pin
135 groove
14 feed valve seat
143 space to receive feed valve
145 seat wall
20 rear barrel assembly
21 cylindrical body
22 rear end
221 passage
222 female threads (to 241)
23 front end
231 male threaded to collar (to 111)
232 stopping flange
233 female thread (313)
24 sleeve
241 male thread (to 222)
25 gas intake rod 251 head
30 valve assembly
31 stem
311 needle pin
312 retaining disc (F.0.)
313 male thread (to 233)
314 gas inlet hole
315 retaining flange ($O_2$)
316 retaining flange ($O_2$)
317 knurled knob
318 female thread (to 423)
40 front barrel assembly
41 cylindrical body
411 rear end female thread
412 front end opening (to 53)
413 front end female thread
414 air inlet
42 connector (30/40)
421 retaining flange (03, 04)
422 nipple
423 male thread, rear (to 318)
424 retaining passage (F2)
425 male thread, front (to 411)
426 nozzle
50 cooling fin unit
51 front end male threaded nipple (to 62)
52 fins
53 rear end male thread (to 413)
54 passage
60 tool head
61A torch
61B soldering tip
61C hot knife (not shown)
62 female thread, adapted to 51

DETAILED DESCRIPTION OF THE INVENTION

Figure 1:
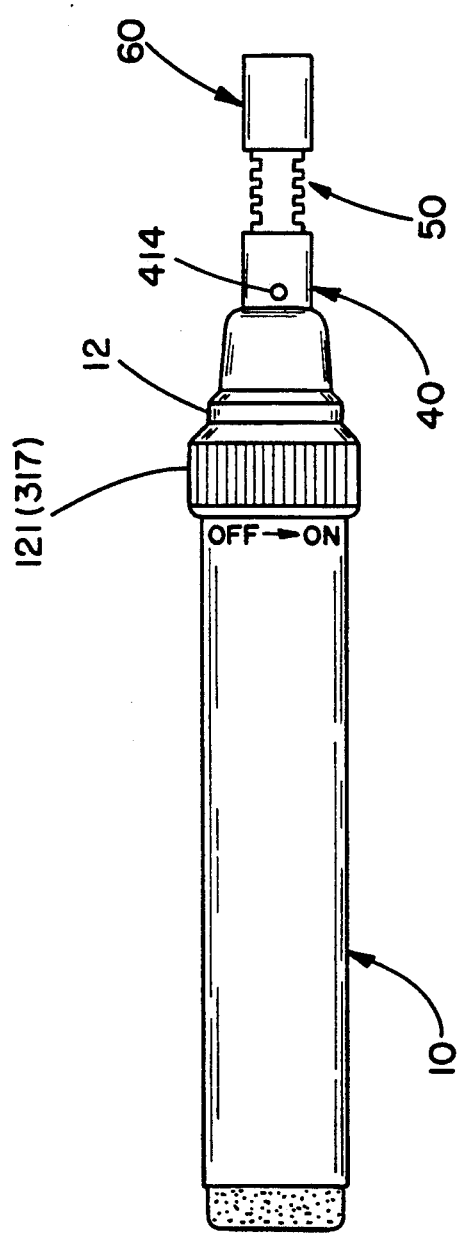
FIG. 1 is a perspective view showing a preferred embodiment of the soldering tool of the present invention.

Now referring to FIG. 1 for the general appearance of a preferred embodiment, the tool of the present invention comprises a cylindrical gas tank 10 serving also as the tool holding means as well as the enclosure of the main parts for pressure control to the tool head 60.

Figure 2:
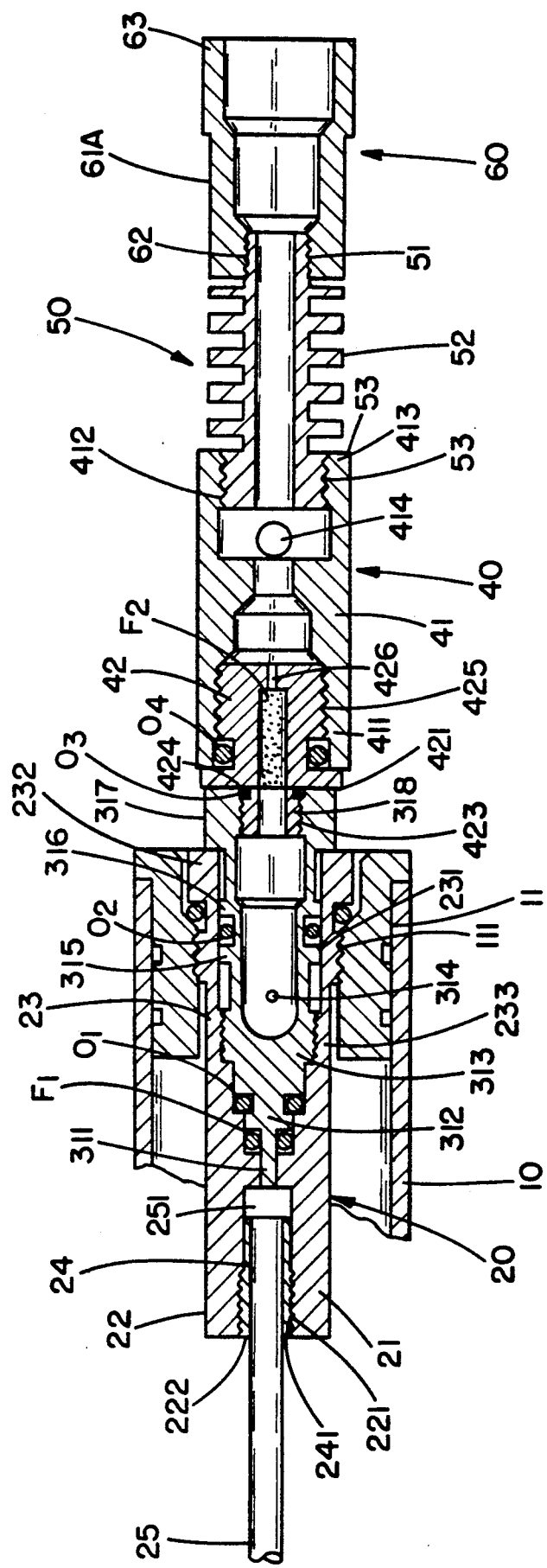
FIG. 2 is a partial sectional view of a side elevation of the preferred embodiment of the soldering tool of the present invention.
Figure 3:
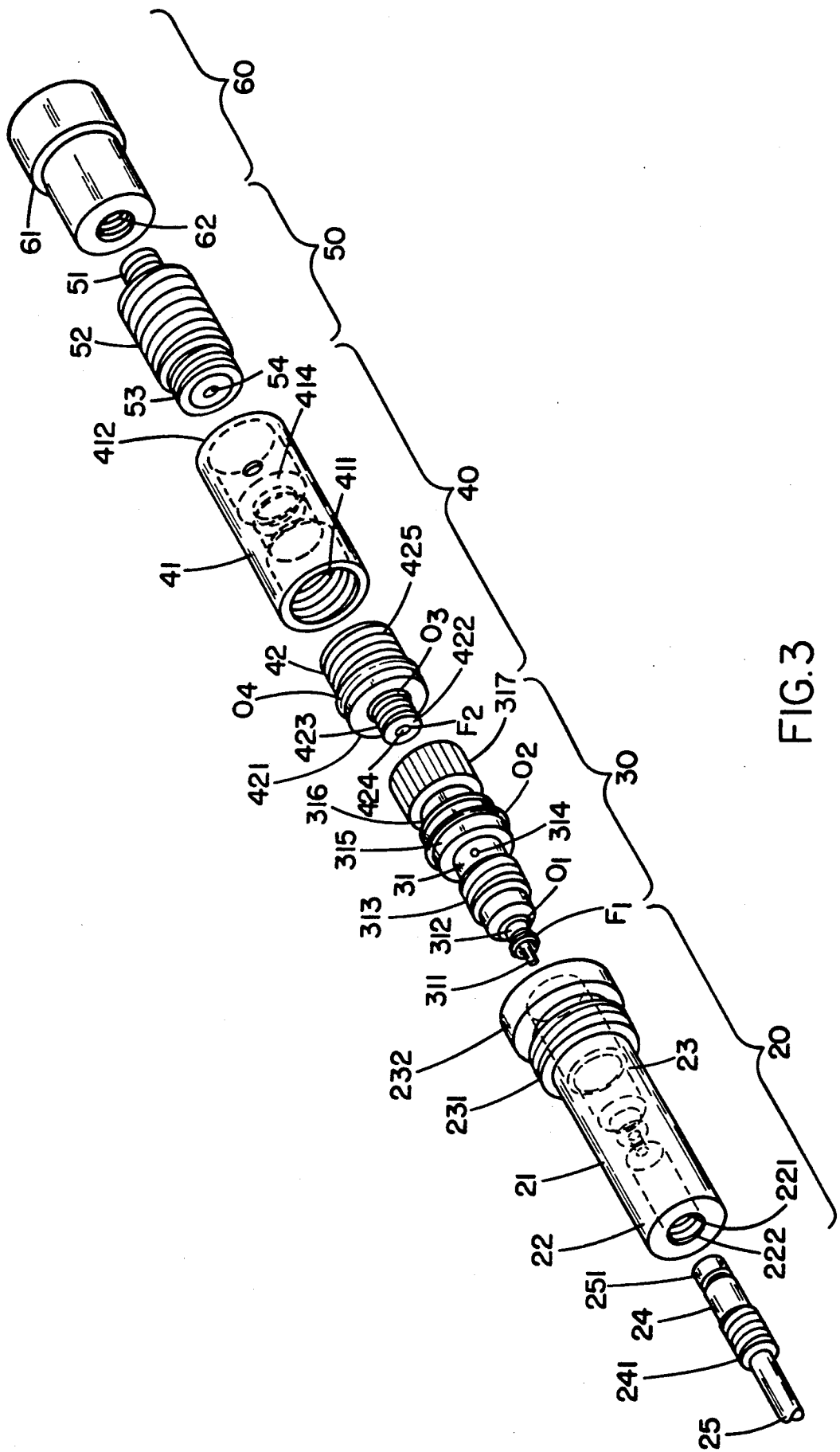
FIG. 3 is a partial perspective exploded view of the mechanism and parts thereof relating to the embodiment of FIG. 2.

Referring also to FIG. 2 and FIG. 3, the pressure regulation and control mechanism comprises a rear barrel 20 and a front barrel 40 with a connector 42 disposed inbetween. The rear barrel assembly 20 comprises a cylindrical body 21 having female threads 222 provided in the interior of a passage 221 disposed within the rear end 22 to engage with a male thread 241 on the outer surface of a sleeve 24 in which a gas intake rod 25 of gas permeable material having a bulged head 251 is inserted from the interior. The front end 23 of the cylindrical body 21 has a stopping flange 232 disposed at its front end and a male threaded collar 231 is disposed next to it to be engaged with the male threads 111 (FIG. 2) disposed within the front opening 11 of the collar 13 of the gas tank 10 so that the front end of the opening abuts against the rear of the flange 232. In this manner the entire length of the rear barrel 20 except the flange 232 is inserted within the gas tank 10 through its opening 11.

Within the front end 23 of the cylindrical body 21, female thread 233 is provided to match with a male thread 313 on a valve assembly 30 which will be described hereinbelow.

The valve assembly 30 comprises a stem 31 with a solid needle pin 311 projecting to the rear and connected with an integrally formed retaining disc 312. Behind the disc 312, around the needle pin 311, a block of spongy filter F1 is disposed to buffer the gas pressure P1 from the gas tank 10 to a reduced value P2. The disc 312 serves also as a retainer to an 0 ring 01 expanded into a groove disposed between the disc 312 and the rear end of the stem 31. Adjacent the rear end of the stem 31, a male thread 313 is provided to match with a female thread 233 within the front passage 23 of the cylindrical body. In the middle portion of the stem 31, a small hole 314 serving as gas inlet is disposed radially in the stem. A pair of retaining flanges 315/316 are provided on the stem to hold a further 0 ring 02 of larger diameter. Spaced from the flange 316, at the front end of the stem 31, a knurled knob 317 is disposed to be engaged with a cap 12 (FIG. 1 and FIG. 5), with corresponding knurled knob 121 outside the cap to serve as on/off switch, and as a pressure regulator.

From the rear portion up to the needle pin the stem 31 is solid, while in the front portion starting from the gas inlet hole 314, the stem is hollowed to provide a dome-like new passage leading to be connected to a front barrel assembly 40.

Within the knurled knob 317, female thread 318 (FIG. 2) is provided to take a nipple 422 having male thread 423. The nipple 422 is made in one piece with a flange 421 to retain respectively an O ring 03 in the rear and O ring 04 in front. The nipple further provides a passage 424 in which a filter is placed filled with metallurgical power F2. In front of the passage 424 is formed a nozzle 426 with a reduced diameter and the gas pressure is lowered to a value of P2.

The connector 42 with an outside male thread 425 is actually a part of the front barrel assembly 40. Thread 425 is to engage with the female thread 411 provided in the interior of the hollow passage of the cylindrical body 41, near the front end of the body 41. An inlet hole 414 is provided to intake air to be mixed with the gas exiting from the nozzle 426. Female thread 413 within the front end opening 412 is provided for the connection of a cooling fin through a male thread 53 disposed at the rear end thereof. Passage 54 goes all the way through to reach a tool head 61 via a male thread nipple 51 and a female thread 62 in the rear end adapter of the tool head 60. Tool head 60 could be a torch 61A such as shown in FIGS. 1, 2 and 3, or 61B as shown in FIGS. 7 and 8, which may also be a soldering tip of any conventional type including the one disclosed in the recently granted U.S. Pat. No. 4,858,593 of the same applicant, or a hot knife 61C (not shown) for cutting.

The route of the gas supply is once more traced as follows: gas intake rod 25——rear end passage 221 of rear barrel 21——needle valve 311——sponge filter F1——around O ring 01——gas inlet hole 314——metallurgical powder filter F2——passage in front barrel 41 (mixed with air from inlet 414)——passage 54 in cooling fin——front end nipple 51——adapter 62——tool (tip).

All the O rings 01-04 are provided for sealing off of any possible leakage to ensure gas tightness so that no waste occurs. Filters F1, F2 are provided to filter out impurities such as dust and also to retard the gas flow through adjustment of the needle pin 311 against the rod head 251 by turning the cap 12 which is engaged with the knurled knob 317 and is freely rotatable about the gas tank 10 (FIG. 1).

Figure 4:
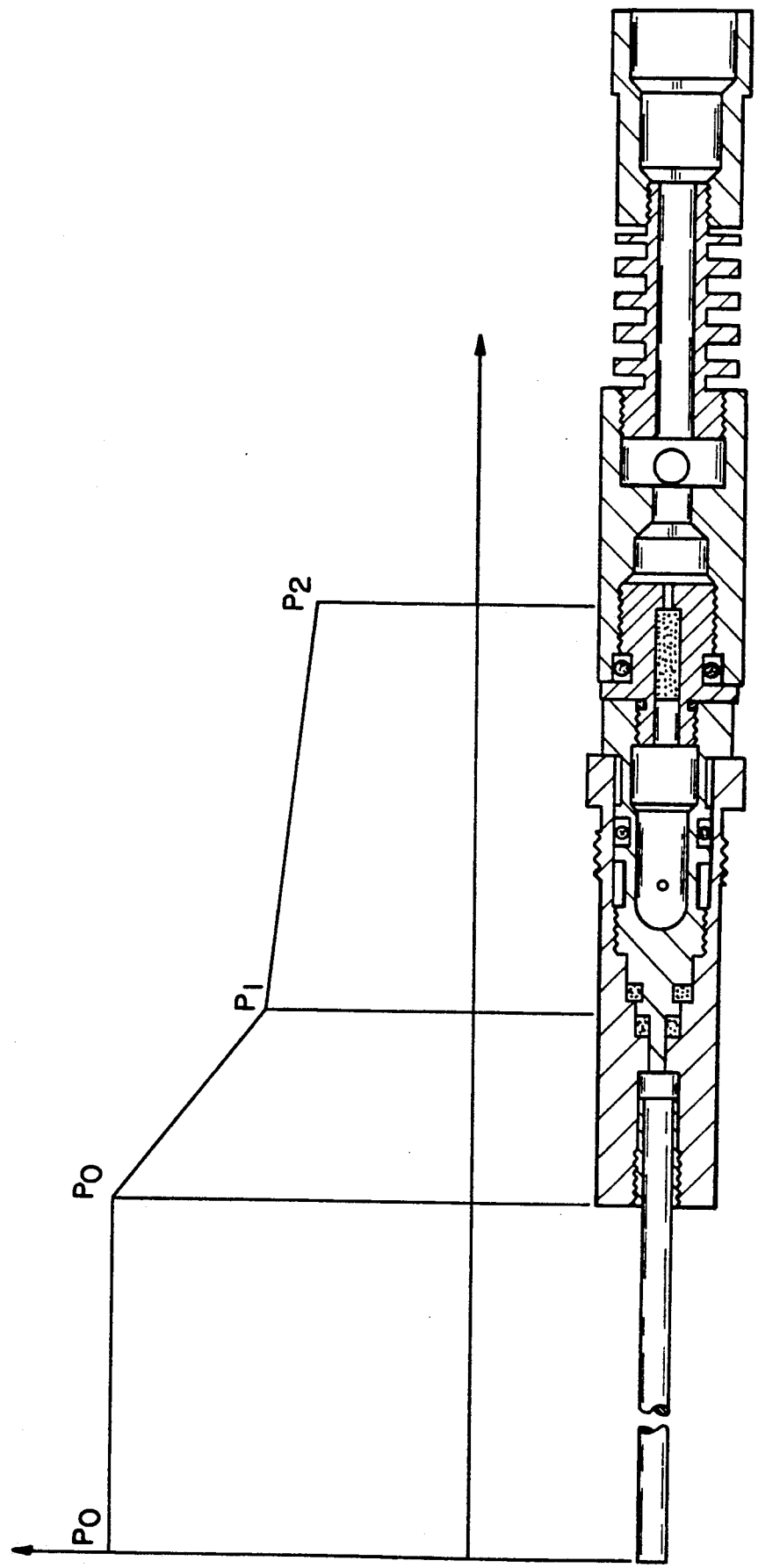
FIG. 4 is a diagram showing the pressure gradient of the fuel from the upstream or rear end where the fuel tank is located to the front or downstream end where the soldering tip is disposed.
Figure 6B:
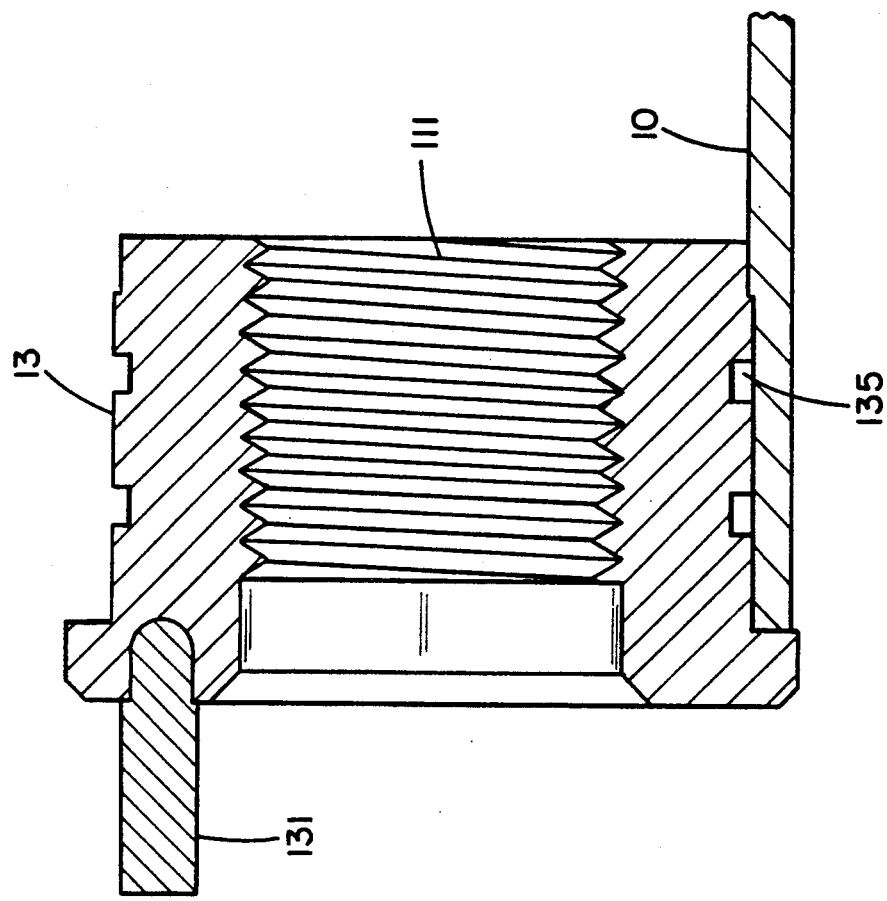
FIG. 6 is a diagram showing the enlarged view of collar 13.
Figure 6A:
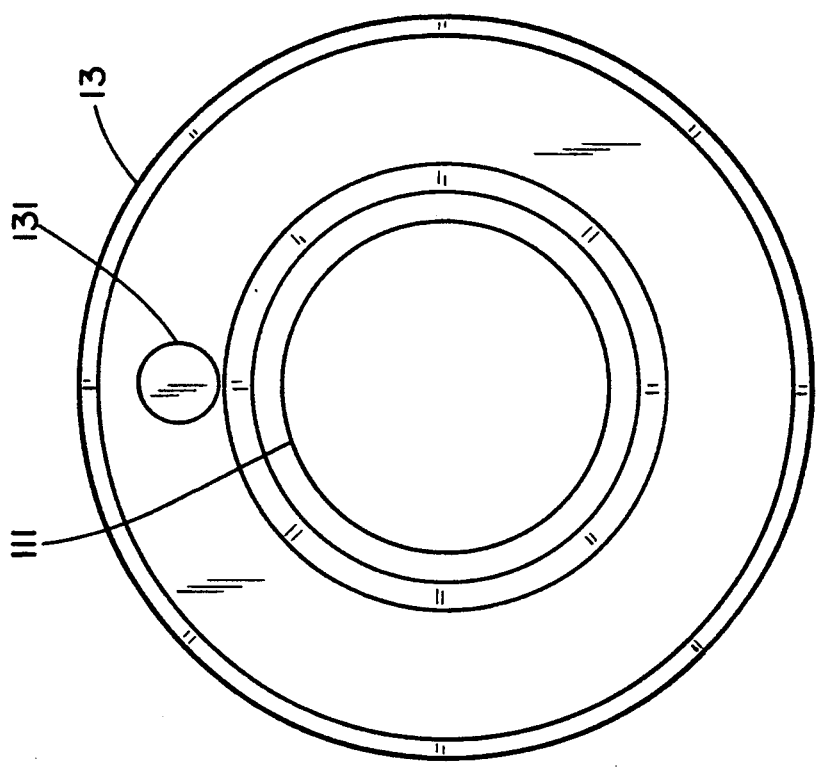

FIG. 4 is a diagram showing the pressure drop from a valve P1 in the gas tank to the P2 provided for use. It is worth mentioning that the drop from P1 around filter F1 to P2 around filter F2 is a feature of the present invention, the control mechanism giving both improvement in quality and quantity of gas supply.

What is claimed:

1. A gas powered soldering tool comprising a cylindrical gas tank (10) at the rear end thereof, said gas tank having at the rear end thereof a gas intake rod (25), for the storage of fuel gas and serving as a tool holder, and having a soldering tip (61B) at the front end thereof, a rear barrel assembly (20) and a front barrel assembly (40), said rear barrel assembly and said front barrel assembly containing the pressure regulation means and switching means (317), said rear barrel being held firmly at the front end thereof to said gas tank, said rear barrel assembly and said front barrel assembly being connected by a connector (42), said connector being part of said front barrel assembly, the major part of said rear barrel assembly being disposed within said gas tank, said rear barrel assembly having a channel (221) in the interior thereof for communication with said gas intake rod, a valve assembly (30) between said rear barrel assembly and said front barrel assembly, first threading means (233, 313) for connecting the front end of said rear barrel assembly to said valve assembly, said valve assembly comprising at the rear end thereof a stem (31), a needle valve (311) projecting to the rear from said stem, a gas inlet orifice (314) in said stem, and switching means (317) at the front end of said valve assembly, said stem being hollow from said gas inlet orifice to the front end of said valve assembly to provide a passage for communication with said front barrel assembly, said front barrel assembly having a nipple (422) at the rear end thereof which provides a passage (424) and a nozzle (426) in front of said passage, second threading means (318, 423) for connecting said front barrel assembly to said nipple, said front barrel assembly being provided with air inlet orifices (414) and serving as a chamber for mixing air with said gas exiting from said nozzle, a cooling fin unit (50) disposed in front of said front barrel assembly, third threading means (413, 53) connecting said cooling fin unit with said front barrel assembly, a passage (50) provided within said cooling fin unit extending to the soldering tip, whereby a gas route is completed from said intake rod, through said rear end passage (221) of said rear barrel assembly, said needle valve, said gas inlet hole (314), through said valve, the said nozzle, said air-gas mixing space (414), leading within said passage of the fin unit to the fuel tip.

2. The tool according to claim 1 wherein first filtering means ($F_1$) made of spongy material are provided around said needle valve (311).

3. The tool according to claim 1 wherein second filtering means ($F_2$) made of metallurgical powder material are located within said nipple.

4. The tool according to claim 1 wherein the gas intake rod is made of gas permeable material.

5. The tool according to claim 1 wherein fourth threading means (222, 241) are provided between said gas tank and said rear barrel assembly and first sealing means (151) are placed around said third threading means.

6. The tool according to claim 5 wherein said stem (31) has a pair of retaining rings (315, 316) and second sealing means ($O_1$) are provided at the rear end of said valve assembly, third sealing means ($O_2$) are provided around said retaining rings, said nipple (422) has a flange and fourth and fifth sealing means ($O_3$, $O_4$) are located respectively in the rear and in front of said flange.

7. The tool according to claim 1 wherein said gas tank has a cap (12) rotatably mounted thereon and said switching means comprises a knurled knob (317), located between said rear and said front barrel assembly, said knob engages with said cap.

8. The tool according to claim 1 wherein the tip is a torch.

9. The tool according to claim 1 wherein the tip has a catalytic combustion element as the heating medium.

10. The tool according to claim 1 wherein the tip is a knife.

* * * * *